US012772268B2

(12) United States Patent
Sengupta et al.

(10) Patent No.: US 12,772,268 B2
(45) Date of Patent: Oct. 20, 2026

(54) RECEPTION OF NEW RADIO (NR) MULTICAST AND BROADCAST SERVICE (MBS) CONTROL AND DATA IN THE DOWNLINK

(71) Applicant: Intel Products IP LLC, Santa Clara, CA (US)

(72) Inventors: Avik Sengupta, Santa Clara, CA (US); Debdeep Chatterjee, San Jose, CA (US); Gang Xiong, Portland, OR (US)

(73) Assignee: Intel Products IP LLC, Santa Clara, CA (US)

( * ) Notice: Subject to any disclaimer, the term of this patent is extended or adjusted under 35 U.S.C. 154(b) by 207 days.

(21) Appl. No.: 18/723,334

(22) PCT Filed: Feb. 13, 2023

(86) PCT No.: PCT/US2023/062487
§ 371 (c)(1),
(2) Date: Jun. 21, 2024

(87) PCT Pub. No.: WO2023/154921
PCT Pub. Date: Aug. 17, 2023

(65) Prior Publication Data

US 2025/0063578 A1 Feb. 20, 2025

Related U.S. Application Data

(60) Provisional application No. 63/309,844, filed on Feb. 14, 2022.

(51) Int. Cl.
*H04W 72/30* (2023.01)
*H04W 72/0453* (2023.01)
*H04W 72/23* (2023.01)

(52) U.S. Cl.
CPC ....... *H04W 72/30* (2023.01); *H04W 72/0453* (2013.01); *H04W 72/23* (2023.01)

(58) Field of Classification Search
CPC . H04W 72/30; H04W 72/0453; H04W 72/23; H04L 5/001
See application file for complete search history.

(56) References Cited

U.S. PATENT DOCUMENTS

2019/0363843 A1* 11/2019 Gordaychik .......... H04L 1/0013
2021/0250918 A1 8/2021 Liu et al.

(Continued)

OTHER PUBLICATIONS

Huawei, "New Work Item on NR support of Multicast and Broadcast Services," 3GPP TSG RAN Meeting #86, RP-193248 (revision of RP-193163), Agenda Item: 9.1.2, Dec. 9-12, 2019, Sitges, Spain, 5 pages.

(Continued)

*Primary Examiner* — Mohammad S Anwar
(74) *Attorney, Agent, or Firm* — Schwegman Lundberg & Woessner, P.A.

(57) ABSTRACT

Various embodiments herein provide techniques related to downlink multicast and broadcast service (MBS) data and control. In embodiments, abase station may identify, based on an active bandwidth part (BWP) of a user equipment (UE), a transmission control indicator (TCI) state list configuration related to a unicast transmission to the UE; and transmit the multicast or broadcast transmission based on the TCI state list. Other embodiments may be described and/or claimed.

20 Claims, 6 Drawing Sheets

(56) References Cited

U.S. PATENT DOCUMENTS

2021/0410220 A1* 12/2021 Liu .................... H04L 12/1868
2023/0397208 A1* 12/2023 Khoshnevisan ...... H04L 1/0027

OTHER PUBLICATIONS

3GPP, "RAN1 Chair's Notes," 3GPP TSG RAN WG1 #107bis-e, e-Meeting, Jan. 17-25, 2022, 83 pages.
3GPP, "Technical Specification Group Radio Access Network; Evolved Universal Terrestrial Radio Access (E-UTRA); Study on single-cell point-to-multipoint transmission for E-UTRA (Release 13)," 3GPP TR 36.890 V13.0.0 (Jun. 2015), Lte Advanced, 31 pages.
3GPP, "Technical Specification Group Radio Access Network; NR; Physical channels and modulation (Release 17)," 3GPP TS 38.211 V17.0.0 (Dec. 2021), 5G, 134 pages.
3GPP, "Technical Specification Group Radio Access Network; NR; Multiplexing and channel coding (Release 17)," 3GPP TS 38.212 V17.0.0 (Dec. 2021), 5G, 190 pages.
3GPP, "Technical Specification Group Radio Access Network; NR; Physical layer procedures for control (Release 17)," 3GPP TS 38.213 V17.0.0 (Dec. 2021), 5G, 225 pages.
3GPP, "Technical Specification Group Radio Access Network; NR; Physical layer procedures for data (Release 17)," 3GPP TS 38.214 V17.0.0 (Dec. 2021), 5G, 217 pages.
International Patent Office—International Search Report and Written Opinion mailed Jun. 16, 2023, from International Patent Application No. PCT/US2023/062487, 10 pages.
Ericsson, "Mechanisms to support MBS group scheduling for RRC_CONNECTED UEs," 3GPP TSG-RAN WG1 Meeting #107bis-e, R1-2200665, Agenda Item: 8.12.1, e-Meeting, Jan. 17- 25, 2022, 11 pages.
Nokia et al., "Remaining Issues on Group Scheduling Mechanisms for RRC_CONNECTED UEs supporting MBS," 3GPP TSG RAN WG1 Meeting #108-e, R1-2201006, Agenda item: 8.12.1, e-Meeting, Feb. 21-Mar. 3, 2022, 4 pages.
Qualcomm Incorporated, "View on group scheduling for Multicast RRC_CONNECTED UEs," 3GPP TSG RAN WG1 #107-e, R1-2112239, Agenda item: 8.12.1, e-Meeting, Nov. 11-19, 2021, 8 pages.
Spreadtrum Communication, "Discussion on the remaining issues on MBS group scheduling for RRC_CONNECTED UEs," 3GPP TSG RAN WG1 #107bis-e, R1-2200283, Agenda Item: 8.12.1, e-Meeting, Jan. 17-25, 2022, 3 pages.

* cited by examiner

RECEPTION OF NEW RADIO (NR) MULTICAST AND BROADCAST SERVICE (MBS) CONTROL AND DATA IN THE DOWNLINK

CROSS REFERENCE TO RELATED APPLICATIONS

The present application is a national phase entry under 35 U.S.C. § 371 of International Application No. PCT/US2023/062487, filed Feb. 13, 2023, entitled "RECEPTION OF NEW RADIO (NR) MULTICAST AND BROADCAST SERVICE (MBS) CONTROL AND DATA IN THE DOWNLINK," which claims priority under 35 U.S.C. § 119(e) to U.S. Provisional Patent Application No. 63/309,844, which was filed Feb. 14, 2022, the entire disclosures of which are hereby incorporated by reference.

FIELD

Various embodiments generally may relate to the field of wireless communications. For example, some embodiments may relate to new radio (NR) downlink data and/or control signals. Specifically, some embodiments may relate to multicast and broadcast service (MBS) data and/or control signals in NR downlink.

BACKGROUND

Various embodiments generally may relate to the field of wireless communications.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
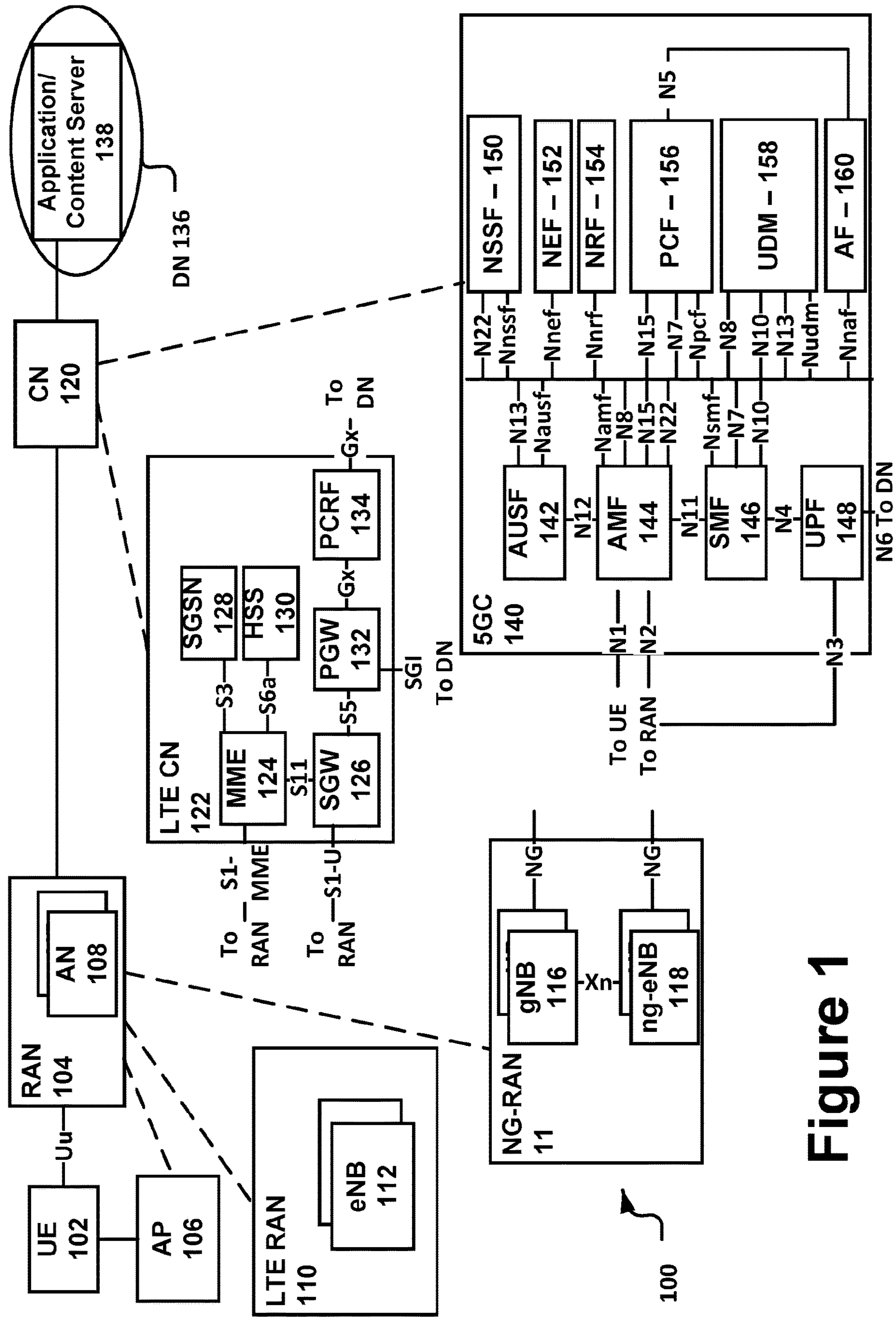
FIG. 1 schematically illustrates a wireless network in accordance with various embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

Embodiments herein relate to third generation partnership project (3GPP) new radio (NR) release-17 (Rel-17) work to support multicast and broadcast services (MBS) within a single cell. Embodiments may additionally or alternatively be related to groupcast operations for the purpose of critical communications and commercial use cases such as popular video/application downloads.

The Rel-17 specifications may relate to or include one or more of the following objectives with respect to physical layer enhancements to support reliability improvements in MBS transmissions in NR:

- Specify radio access network (RAN) basic functions for broadcast and/or multicast to or from user equipments (UEs) in the RRC_CONNECTED state; and
- Specify changes to improve reliability of MBS, e.g. by using uplink (UL) feedback. In some embodiments, the level of reliability may be based on the requirements of the application/service provided.

For NR MBS in Rel-17, a group-common downlink control information (DCI) format 4_0/4_1/4_2 scrambled by a group-common radio network temporary identifier (RNTI) or GERAN-RNTI (G-RNTI) can schedule a group-common physical downlink shared channel (PDSCH) where the PDSCH is transmitted within a common frequency resource which is contained within an active bandwidth part (BWP) for a UE in RRC_CONNECTED mode and within the initial BWP, CORESET #0 or configured BWP for a UE in RRC_IDLE/INACTIVE mode. For Rel-17 MBS, RRC_IDLE/INACTIVE mode UEs may only receive broadcast transmission with no HARQ-ACK feedback possible, and UEs in RRC_CONNECTED mode may receive broadcast transmissions as well as multicast transmissions. In some embodiments HARQ-ACK feedback may be semi-statically or dynamically configured for multicast.

Various embodiments herein provide solutions for the case when a multicast transmission is scheduled with UE PDSCH processing capability 1 and a unicast transmission to the same UE is scheduled with UE PDSCH processing capability 2. Additionally, embodiments also provide solutions for transmission configuration indicator (TCI) state activation/update, and default beam assumptions for multicast and broadcast transmission using DCI formats 4_0/4_1/4_2.

Group Scheduling for NR-MBS:

For fifth generation (5G) NR, support of MBS may provide support of broadcast and multicast services within a single NR cell mainly targeting groupcast operations for the purpose of critical communications and commercial use cases such as video and/or application downloads. Broadcast or low quality of service (QoS) delivery may be received by UEs in both RRC_IDLE/INACTIVE and CONNECTED mode whereas multicast or high QoS delivery may be received only by RRC_CONNECTED UEs.

For multicast communication, the following example modes to support transmissions from a base station such as a gNodeB (gNB) to one or more UEs may be used:

- Point to Multipoint (PTM) initial transmission and retransmission: For RRC_CONNECTED UEs in the same MBS group, use group-common PDCCH with cyclic redundancy check (CRC) scrambled by G-RNTI to schedule group-common PDSCH which is scrambled with the same group-common RNTI. This scheme may be referred to herein as a group-common PDCCH based group scheduling scheme. Both initial transmissions and retransmission may be made using this scheme.

Point to Point (PTP) retransmission: For RRC_CONNECTED UEs, use UE-specific PDCCH with CRC scrambled by UE-specific RNTI (e.g., C-RNTI) to schedule UE-specific PDSCH which is scrambled with the same UE-specific RNTI to retransmit a GC-PDSCH which was not successfully received by the UE during PTM initial transmission.

The term ‘UE-specific PDCCH/PDSCH’ as used herein may indicate that the PDCCH/PDSCH may only be identified by the target UE but cannot be identified by the other UEs in the same MBS group with the target UE. Additionally, support of semi-persistent scheduling (SPS) may be used for Rel-17 NR MBS, where the group-common PDSCH is scrambled by a G-CS-RNTI.

UE PDSCH Processing Procedure Time:

In 5G NR, the first uplink symbol that a UE can use for sending HARQ-ACK feedback in response to reception of a PDSCH may start no earlier than at symbol $L_1$, where $L_1$ is defined as the next uplink symbol with its cyclic prefix (CP) starting after $T_{proc,1}=(N_1+d_{1,1}+d_2)(2048+144)\cdot\kappa 2_{-\mu}\cdot T_C+T_{ext}$ after the end of the last symbol of the PDSCH carrying the transport block (TB) being acknowledged. $N_1$ may be based on μ of 3GPP TS 38.214 v16.2.0 Table 5.3-1 (reproduced below) and Table 5.3-2 (also reproduced below) for UE processing capability 1 and 2 respectively. In this example, μ corresponds to the one of ($\mu_{PDCCH}$, $\mu_{PDSCH}$, $\mu_{UL}$) resulting with the largest $T_{proc,1}$, where the $\mu_{PDCCH}$ corresponds to the subcarrier spacing of the PDCCH scheduling the PDSCH, the $\mu_{QDSCH}$ corresponds to the subcarrier spacing of the scheduled PDSCH, and $\mu_{UL}$ corresponds to the subcarrier spacing of the uplink channel with which the HARQ-ACK is to be transmitted.

TABLE 5.3-1

PDSCH processing time for PDSCH processing capability 1

| μ | PDSCH decoding time $N_1$ [symbols]: dmrs-AdditionalPosition = ‘pos0’ in DMRS-DownlinkConfig in dmrs-DownlinkForPDSCH-MappingTypeA and dmrs-DownlinkForPDSCH-MappingTypeB if either higher layer parameter is configured, and in dmrs-DownlinkForPDSCH-MappingTypeA-DCI-1-2 and dmrs-DownlinkForPDSCH-MappingTypeB-DCI-1-2 if either higher layer parameter is configured | dmrs-AdditionalPosition ≠ ‘pos0’ in DMRS-DownlinkConfig in any of dmrs-DownlinkForPDSCH-MappingTypeA, dmrs-DownlinkForPDSCH-MappingTypeB, dmrs-DownlinkForPDSCH-MappingTypeA-DCI-1-2, dmrs-DownlinkForPDSCH-MappingTypeB-DCI-1-2, or if none of the higher layer parameters is configured |
|---|---|---|
| 0 | 8 | $N_{1,0}$ |
| 1 | 10 | 13 |
| 2 | 17 | 20 |
| 3 | 20 | 24 |
| 5 | 80 | 96 |
| 6 | 160 | 192 |

TABLE 5.3-2

PDSCH processing time for PDSCH processing capability 2

| μ | PDSCH decoding time $N_1$ [symbols]: dmrs-AdditionalPosition = ‘pos0’ in DMRS-DownlinkConfig in dmrs-DownlinkForPDSCH-MappingTypeA and dmrs-DownlinkForPDSCH-MappingTypeB if either higher layer parameter is configured, and in dmrs-DownlinkForPDSCH-MappingTypeA-DCI-1-2 and dmrs-DownlinkForPDSCH-MappingTypeB-DCI-1-2 if either higher layer parameter is configured |
|---|---|
| 0 | 3 |
| 1 | 4.5 |
| 2 | 9 for frequency range 1 |

In some embodiments, for any MBS PDSCH scheduled by DCI formats 4_1/4_2, UE processing capability 2 (as depicted in Table 5.3-2) is not applied.

DETAILS OF VARIOUS EMBODIMENTS

PDSCH Processing Time Capability for Unicast and Multicast:

For the purpose of this disclosure, the term “unicast PDSCH” may refer to a PDSCH scrambled by C-RNTI and scheduled using a DCI format 1_1/1_2 in CORESET associated with UE specific search set or Type 3 common search space. Additionally, the term “multicast PDSCH” may refer to a group-common PDSCH scrambled by a G-RNTI (or G-CS-RNTI) which is scheduled using a DCI format 4_1/4_2.

Embodiments may also refer to a number of symbols X, where:

For PDSCH with dmrs-AdditionalPosition=‘pos0’: X is given by the first column of Table 5.3-1 (depicted above) for the respective subcarrier spacing (SCS) values For PDSCH with dmrs-AdditionalPosition≠‘pos0’: X is given by the second column of Table 5.3-1 for the respective SCS values Because UE capability 2 for PDSCH processing time may not be applicable for MBS, a multicast PDSCH scheduled by DCI formats 4_1 or 4_2 may be associated with PDSCH processing timeline per capability 1 (e.g., as depicted in Table 5.3-1) for HARQ-ACK feedback. On the other hand, for a UE configured with PDSCH processing time per capability 2 (e.g., as depicted in Table 5.3-2) in a serving cell, the UE may be expected to process unicast PDSCH scheduled at least by DCI formats 1_1 or 1_2 according to PDSCH processing capability 2. Combining these two, it can be seen that in case a “fast PDSCH” (e.g., a unicast PDSCH following capability 2 processing time) is preceded by a “slow PDSCH” (e.g., a multicast PDSCH to follow capability 1 processing timeline) with a gap that is smaller than the processing time for the “slower” multicast PDSCH, the UE may not be able to clear the processing pipeline soon enough to process the “faster” unicast PDSCH.

The following relates to various embodiments or techniques that may address this issue and enable efficient pipelined UE implementation for PDSCH processing.

In one embodiment, when scheduled with a multicast PDSCH in a cell with the field processingType2Enabled in PDSCH-ServingCellConfig set to 1 e.g., UE PDSCH processing time capability 2 is enabled, a UE may not expect to be scheduled with a unicast PDSCH to follow capability 2 that is scheduled by DCI format 1_1 or DCI format 1_2 or is an SPS unicast PDSCH if the first symbol of the unicast PDSCH associated with capability 2 starts before X symbols from the last symbol of the multicast PDSCH.

In another embodiment, when scheduled with one or more multicast PDSCH(s) in a cell with the field processingType2Enabled in PDSCH-ServingCellConfig set to 1 e.g., UE PDSCH processing time capability 2 is enabled, a UE may skip decoding a number of multicast PDSCHs with last symbol within X symbols before the start of a PDSCH to follow capability 2 that may be scheduled by DCI format 1_1 or DCI format 1_2 or may be an SPS unicast PDSCH wherein X is defined similar to the previous embodiment. In a further example of the embodiment, a UE may be expected to report negative acknowledgements (NACK(s)) corresponding to the one or more multicast PDSCHs that were not decoded due to dropping. Alternatively, a UE may be expected to report NACK(s) corresponding to the one or more multicast PDSCHs that were not decoded due to dropping when NACK-only feedback is configured for the multicast PDSCHs while the UE may skip reporting a hybrid automatic repeat request (HARQ)-ACK feedback when ACK/NACK feedback is configured for the multicast PDSCHs.

As one option, the above embodiments and examples may be applied to a UE that does not indicate capability of simultaneous reception of unicast and multicast PDSCHs such that the unicast and multicast PDSCHs overlap in at least one OFDM symbol but are multiplexed via frequency domain multiplexing (FDM). However, for a UE that indicates capability of simultaneous reception of unicast and multicast PDSCHs, the UE may utilize the ability to process two PDSCHs overlapping in time to handle the overlapping of the PDSCH processing timelines arising due to insufficient gap between a “faster” unicast PDSCH that may follow a “slow” multicast PDSCH. Note that this case includes both cases when the unicast and multicast PDSCHs may or may not have time domain overlaps.

Thus, in an embodiment, if a UE indicates capability for receiving frequency domain multiplexed unicast PDSCH and multicast PDSCH, when scheduled with a multicast PDSCH in a cell with the field processingType2Enabled in PDSCH-ServingCellConfig set to 1 e.g., UE PDSCH processing time capability 2 is enabled, the UE may not expect to be scheduled with more than one unicast PDSCH to follow capability 2 that may be scheduled by DCI format 1_1 or DCI format 1_2 or may be an SPS unicast PDSCH such that the first symbol of the unicast PDSCH associated with capability 2 starts before X symbols from the last symbol of the multicast PDSCH wherein X is defined similar to the previous embodiments.

In another embodiment, if a UE indicates capability for receiving frequency domain multiplexed unicast PDSCH and multicast PDSCH, when scheduled with one or more multicast PDSCHs in a cell with the field processingType2Enabled in PDSCH-ServingCellConfig set to 1 e.g., UE PDSCH processing time capability 2 is enabled, the UE may be expected to receive at most one and skip decoding a number of multicast PDSCHs with last symbol within X symbols before the start of a PDSCH to follow capability 2 that may be scheduled by DCI format 1_1 or DCI format 12 or may be an SPS unicast PDSCH wherein X is defined similar to the previous embodiments. In an example of the embodiment, in case multiple multicast PDSCHs have ending symbols within X symbols before the start of the unicast PDSCH with capability 2 timeline, the UE may be expected to receive the multicast PDSCH with the latest ending symbol within X symbols before the start of the unicast PDSCH following capability 2 timeline and may skip decoding of the earlier multicast PDSCHs. In a further example of the embodiment, a UE may be expected to report NACK(s) corresponding to the one or more multicast PDSCHs that were not decoded due to dropping. Alternatively, a UE may be expected to report NACK(s) corresponding to the one or more multicast PDSCHs that were not decoded due to dropping when NACK-only feedback is configured for the multicast PDSCHs while the UE may skip reporting a HARQ-ACK feedback when ACK/NACK feedback is configured for the multicast PDSCHs.

Default Beam Assumptions for MBS:

In one embodiment, multicast and broadcast PDSCH scheduled by group-common PDCCH formats 4_0/4_1/4_2 uses the TCI state list configuration from PDSCH-Config for unicast provided in the BWP configuration of the active BWP for UEs which contains the common frequency resource (CFR) in which the multicast or broadcast transmission is scheduled. In another embodiment, for RRC_CONNECTED UEs, for the period between RRC configuration of TCI state list and before the activation of the TCI takes effect e.g., before the time threshold when an activated TCI state can be applied, the default beam assumption for the MBS transmission is the same as the unicast case corresponding to the active BWP which contains the CFR in which the MBS transmission is scheduled e.g., the default PDSCH beam follows the beam of the CORESET with the lowest index contained within the BWP containing the CFR. In another embodiment, for RRC_IDLE/INACTIVE UEs, the default beam for the reception of a broadcast PDSCH scheduled by DCI format 40 within the configured CFR should be identical to the beam for CORESET with index 0 which is quasi co-located with an SS/PBCH block.

SPS for MBS:

For multicast, if UE is provided fdmed-Reception-Multicast and if a unicast SPS PDSCH and multicast SPS PDSCH overlap in frequency, in one embodiment, the UE may be expected to receive the multicast SPS PDSCH and may skip decoding the unicast SPS PDSCH. In another embodiment, the UE may be expected to receive the unicast SPS PDSCH and may skip decoding the multicast SPS PDSCH. In one embodiment, in case of time domain overlaps involving more than one multicast SPS PDSCHs or more than one unicast SPS PDSCHs, the above unicast and multicast PDSCHs could be the final PDSCHs after resolving collisions within the set of overlapping multicast SPS PDSCHs and within the set of overlapping unicast SPS PDSCHs. In another embodiment, in case of time domain overlaps involving more than one multicast SPS PDSCHs or more than one unicast SPS PDSCHs, UE may be expected to receive one multi-cast SPS PDSCH with the lowest SPS configuration index. In another option, in case of time domain overlaps involving more than one multicast SPS PDSCHs or more than one unicast SPS PDSCHs, UE may be expected to receive one unicast SPS PDSCH with the lowest SPS configuration index.

Systems and Implementations

FIGS. 1-4 illustrate various systems, devices, and components that may implement aspects of disclosed embodiments.

FIG. 1 illustrates a network 100 in accordance with various embodiments. The network 100 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 100 may include a UE 102, which may include any mobile or non-mobile computing device designed to communicate with a RAN 104 via an over-the-air connection. The UE 102 may be communicatively coupled with the RAN 104 by a Uu interface. The UE 102 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 100 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 102 may additionally communicate with an AP 106 via an over-the-air connection. The AP 106 may manage a WLAN connection, which may serve to offload some/all network traffic from the RAN 104. The connection between the UE 102 and the AP 106 may be consistent with any IEEE 802.11 protocol, wherein the AP 106 could be a wireless fidelity (Wi-Fi®) router. In some embodiments, the UE 102, RAN 104, and AP 106 may utilize cellular-WLAN aggregation (for example, LWA/LWIP). Cellular-WLAN aggregation may involve the UE 102 being configured by the RAN 104 to utilize both cellular radio resources and WLAN resources.

The RAN 104 may include one or more access nodes, for example, AN 108. AN 108 may terminate air-interface protocols for the UE 102 by providing access stratum protocols including RRC, PDCP, RLC, MAC, and L1 protocols. In this manner, the AN 108 may enable data/voice connectivity between CN 120 and the UE 102. In some embodiments, the AN 108 may be implemented in a discrete device or as one or more software entities running on server computers as part of, for example, a virtual network, which may be referred to as a CRAN or virtual baseband unit pool. The AN 108 be referred to as a BS, gNB, RAN node, eNB, ng-eNB, NodeB, RSU, TRxP, TRP, etc. The AN 108 may be a macrocell base station or a low power base station for providing femtocells, picocells or other like cells having smaller coverage areas, smaller user capacity, or higher bandwidth compared to macrocells.

In embodiments in which the RAN 104 includes a plurality of ANs, they may be coupled with one another via an X2 interface (if the RAN 104 is an LTE RAN) or an Xn interface (if the RAN 104 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 104 may each manage one or more cells, cell groups, component carriers, etc. to provide the UE 102 with an air interface for network access. The UE 102 may be simultaneously connected with a plurality of cells provided by the same or different ANs of the RAN 104. For example, the UE 102 and RAN 104 may use carrier aggregation to allow the UE 102 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 104 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 102 or AN 108 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a “UE-type RSU”; an eNB may be referred to as an “eNB-type RSU”; a gNB may be referred to as a “gNB-type RSU”; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 104 may be an LTE RAN 110 with eNBs, for example, eNB 112. The LTE RAN 110 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 104 may be an NG-RAN 114 with gNBs, for example, gNB 116, or ng-eNBs, for example, ng-eNB 118. The gNB 116 may connect with 5G-enabled UEs using a 5G NR interface. The gNB 116 may connect with a 5G core through an NG interface, which may include an N2 interface or an N3 interface. The ng-eNB 118 may also connect with the 5G core through an NG interface, but may connect with a UE via an LTE air interface. The gNB 116 and the ng-eNB 118 may connect with each other over an Xn interface.

In some embodiments, the NG interface may be split into two parts, an NG user plane (NG-U) interface, which carries traffic data between the nodes of the NG-RAN 114 and a UPF 148 (e.g., N3 interface), and an NG control plane (NG-C) interface, which is a signaling interface between the nodes of the NG-RAN114 and an AMF 144 (e.g., N2 interface).

The NG-RAN 114 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 102 can be configured with multiple BWPs where each BWP configuration has a different SCS. When a BWP change is indicated to the UE 102, the SCS of the transmission is changed as well. Another use case example of BWP is related to power saving. In particular, multiple BWPs can be configured for the UE 102 with different amount of frequency resources (for example, PRBs) to support data transmission under different traffic loading scenarios. A BWP containing a smaller number of PRBs can be used for data transmission with small traffic load while allowing power saving at the UE 102 and in some cases at the gNB 116. A BWP containing a larger number of PRBs can be used for scenarios with higher traffic load.

The RAN 104 is communicatively coupled to CN 120 that includes network elements to provide various functions to support data and telecommunications services to customers/subscribers (for example, users of UE 102). The components of the CN 120 may be implemented in one physical node or separate physical nodes. In some embodiments, NFV may be utilized to virtualize any or all of the functions provided by the network elements of the CN 120 onto physical compute/storage resources in servers, switches, etc. A logical instantiation of the CN 120 may be referred to as a network slice, and a logical instantiation of a portion of the CN 120 may be referred to as a network sub-slice.

In some embodiments, the CN 120 may be an LTE CN 122, which may also be referred to as an EPC. The LTE CN 122 may include MME 124, SGW 126, SGSN 128, HSS 130, PGW 132, and PCRF 134 coupled with one another over interfaces (or "reference points") as shown. Functions of the elements of the LTE CN 122 may be briefly introduced as follows.

The MME 124 may implement mobility management functions to track a current location of the UE 102 to facilitate paging, bearer activation/deactivation, handovers, gateway selection, authentication, etc.

The SGW 126 may terminate an S1 interface toward the RAN and route data packets between the RAN and the LTE CN 122. The SGW 126 may be a local mobility anchor point for inter-RAN node handovers and also may provide an anchor for inter-3GPP mobility. Other responsibilities may include lawful intercept, charging, and some policy enforcement.

The SGSN 128 may track a location of the UE 102 and perform security functions and access control. In addition, the SGSN 128 may perform inter-EPC node signaling for mobility between different RAT networks; PDN and S-GW selection as specified by MME 124; MME selection for handovers; etc. The S3 reference point between the MME 124 and the SGSN 128 may enable user and bearer information exchange for inter-3GPP access network mobility in idle/active states.

The HSS 130 may include a database for network users, including subscription-related information to support the network entities' handling of communication sessions. The HSS 130 can provide support for routing/roaming, authentication, authorization, naming/addressing resolution, location dependencies, etc. An S6a reference point between the HSS 130 and the MME 124 may enable transfer of subscription and authentication data for authenticating/authorizing user access to the LTE CN 120.

The PGW 132 may terminate an SGi interface toward a data network (DN) 136 that may include an application/content server 138. The PGW 132 may route data packets between the LTE CN 122 and the data network 136. The PGW 132 may be coupled with the SGW 126 by an S5 reference point to facilitate user plane tunneling and tunnel management. The PGW 132 may further include a node for policy enforcement and charging data collection (for example, PCEF). Additionally, the SGi reference point between the PGW 132 and the data network 1 36 may be an operator external public, a private PDN, or an intra-operator packet data network, for example, for provision of IMS services. The PGW 132 may be coupled with a PCRF 134 via a Gx reference point.

The PCRF 134 is the policy and charging control element of the LTE CN 122. The PCRF 134 may be communicatively coupled to the app/content server 138 to determine appropriate QoS and charging parameters for service flows. The PCRF 132 may provision associated rules into a PCEF (via Gx reference point) with appropriate TFT and QCI.

In some embodiments, the CN 120 may be a 5GC 140. The 5GC 140 may include an AUSF 142, AMF 144, SMF 146, UPF 148, NSSF 150, NEF 152, NRF 154, PCF 156, UDM 158, and AF 160 coupled with one another over interfaces (or "reference points") as shown. Functions of the elements of the 5GC 140 may be briefly introduced as follows.

The AUSF 142 may store data for authentication of UE 102 and handle authentication-related functionality. The AUSF 142 may facilitate a common authentication framework for various access types. In addition to communicating with other elements of the 5GC 140 over reference points as shown, the AUSF 142 may exhibit an Nausf service-based interface.

The AMF 144 may allow other functions of the 5GC 140 to communicate with the UE 102 and the RAN 104 and to subscribe to notifications about mobility events with respect to the UE 102. The AMF 144 may be responsible for registration management (for example, for registering UE 102), connection management, reachability management, mobility management, lawful interception of AMF-related events, and access authentication and authorization. The AMF 144 may provide transport for SM messages between the UE 102 and the SMF 146, and act as a transparent proxy for routing SM messages. AMF 144 may also provide transport for SMS messages between UE 102 and an SMSF. AMF 144 may interact with the AUSF 142 and the UE 102 to perform various security anchor and context management functions. Furthermore, AMF 144 may be a termination point of a RAN CP interface, which may include or be an N2 reference point between the RAN 104 and the AMF 144; and the AMF 144 may be a termination point of NAS (N1) signaling, and perform NAS ciphering and integrity protection. AMF 144 may also support NAS signaling with the UE 102 over an N3 IWF interface.

The SMF 146 may be responsible for SM (for example, session establishment, tunnel management between UPF 148 and AN 108); UE IP address allocation and management (including optional authorization); selection and control of UP function; configuring traffic steering at UPF 148 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMIF 144 over N2 to AN 108; and determining SSC mode of a session. SM may refer to management of a PDU session, and a PDU session or "session" may refer to a PDU connectivity service that provides or enables the exchange of PDUs between the UE 102 and the data network 136.

The UPF 148 may act as an anchor point for intra-RAT and inter-RAT mobility, an external PDU session point of interconnect to data network 136, and a branching point to support multi-homed PDU session. The UPF 148 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 148 may include an uplink classifier to support routing traffic flows to a data network.

The NSSF 150 may select a set of network slice instances serving the UE 102. The NSSF 150 may also determine allowed NSSAI and the mapping to the subscribed S-NSSAIs, if needed. The NSSF 150 may also determine the AMF set to be used to serve the UE 102, or a list of candidate AMFs based on a suitable configuration and possibly by querying the NRF 154. The selection of a set of network slice instances for the UE 102 may be triggered by the AMF 144 with which the UE 102 is registered by interacting with the NSSF 150, which may lead to a change of AMF. The NSSF 150 may interact with the AMF 144 via an N22 reference point; and may communicate with another NSSF in a visited network via an N31 reference point (not shown). Additionally, the NSSF 150 may exhibit an Nnssf service-based interface.

The NEF 152 may securely expose services and capabilities provided by 3GPP network functions for third party, internal exposure/re-exposure, AFs (e.g., AF 160), edge computing or fog computing systems, etc. In such embodiments, the NEF 152 may authenticate, authorize, or throttle the AFs. NEF 152 may also translate information exchanged with the AF 160 and information exchanged with internal network functions. For example, the NEF 152 may translate between an AF-Service-Identifier and an internal 5GC information. NEF 152 may also receive information from other NFs based on exposed capabilities of other NFs. This information may be stored at the NEF 152 as structured data, or at a data storage NF using standardized interfaces. The stored information can then be re-exposed by the NEF 152 to other NFs and AFs, or used for other purposes such as analytics. Additionally, the NEF 152 may exhibit an Nnef service-based interface.

The NRF 154 may support service discovery functions, receive NF discovery requests from NF instances, and provide the information of the discovered NF instances to the NF instances. NRF 154 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 154 may exhibit the Nnrf service-based interface.

The PCF 156 may provide policy rules to control plane functions to enforce them, and may also support unified policy framework to govern network behavior. The PCF 156 may also implement a front end to access subscription information relevant for policy decisions in a UDR of the UDM 158. In addition to communicating with functions over reference points as shown, the PCF 156 exhibit an Npcf service-based interface.

The UDM 158 may handle subscription-related information to support the network entities' handling of communication sessions, and may store subscription data of UE 102. For example, subscription data may be communicated via an N8 reference point between the UDM 158 and the AMF 144. The UDM 158 may include two parts, an application front end and a UDR. The UDR may store subscription data and policy data for the UDM 158 and the PCF 156, and/or structured data for exposure and application data (including PFDs for application detection, application request information for multiple UEs 102) for the NEF 152. The Nudr service-based interface may be exhibited by the UDR 221 to allow the UDM 158, PCF 156, and NEF 152 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 158 may exhibit the Nudm service-based interface.

The AF 160 may provide application influence on traffic routing, provide access to NEF, and interact with the policy framework for policy control.

In some embodiments, the 5GC 140 may enable edge computing by selecting operator/3$^{rd}$ party services to be geographically close to a point that the UE 102 is attached to the network. This may reduce latency and load on the network. To provide edge-computing implementations, the 5GC 140 may select a UPF 148 close to the UE 102 and execute traffic steering from the UPF 148 to data network 136 via the N6 interface. This may be based on the UE subscription data, UE location, and information provided by the AF 160. In this way, the AF 160 may influence UPF (re)selection and traffic routing. Based on operator deployment, when AF 160 is considered to be a trusted entity, the network operator may permit AF 160 to interact directly with relevant NFs. Additionally, the AF 160 may exhibit an Naf service-based interface.

The data network 136 may represent various network operator services, Internet access, or third party services that may be provided by one or more servers including, for example, application/content server 138.

Figure 2:
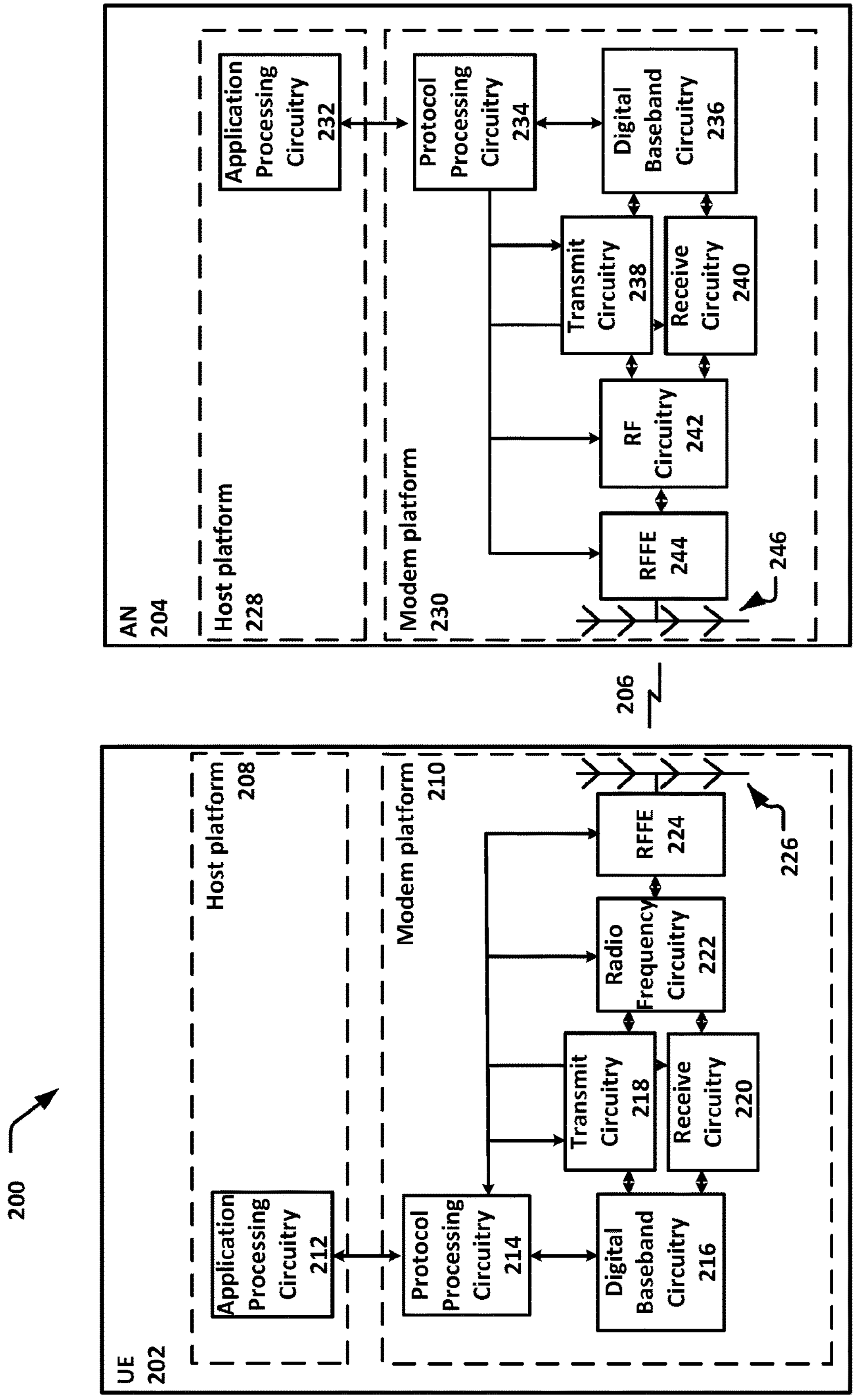
FIG. 2 schematically illustrates components of a wireless network in accordance with various embodiments.

FIG. 2 schematically illustrates a wireless network 200 in accordance with various embodiments. The wireless network 200 may include a UE 202 in wireless communication with an AN 204. The UE 202 and AN 204 may be similar to, and substantially interchangeable with, like-named components described elsewhere herein.

The UE 202 may be communicatively coupled with the AN 204 via connection 206. The connection 206 is illustrated as an air interface to enable communicative coupling, and can be consistent with cellular communications protocols such as an LTE protocol or a 5G NR protocol operating at mmWave or sub-6 GHz frequencies.

The UE 202 may include a host platform 208 coupled with a modem platform 210. The host platform 208 may include application processing circuitry 212, which may be coupled with protocol processing circuitry 214 of the modem platform 210. The application processing circuitry 212 may run various applications for the UE 202 that source/sink application data. The application processing circuitry 212 may further implement one or more layer operations to transmit/receive application data to/from a data network. These layer operations may include transport (for example UDP) and Internet (for example, IP) operations The protocol processing circuitry 214 may implement one or more of layer operations to facilitate transmission or reception of data over the connection 206. The layer operations implemented by the protocol processing circuitry 214 may include, for example, MAC, RLC, PDCP, RRC and NAS operations.

The modem platform 210 may further include digital baseband circuitry 216 that may implement one or more layer operations that are "below" layer operations performed by the protocol processing circuitry 214 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 210 may further include transmit circuitry 218, receive circuitry 220, RF circuitry 222, and RF front end (RFFE) 224, which may include or connect to one or more antenna panels 226. Briefly, the transmit circuitry 218 may include a digital-to-analog converter, mixer, intermediate frequency (IF) components, etc.; the receive circuitry 220 may include an analog-to-digital converter, mixer, IF components, etc.; the RF circuitry 222 may include a low-noise amplifier, a power amplifier, power tracking components, etc.; RFFE 224 may include filters (for example, surface/bulk acoustic wave filters), switches, antenna tuners, beamforming components (for example, phase-array antenna components), etc. The selection and arrangement of the components of the transmit circuitry 218, receive circuitry 220, RF circuitry 222, RFFE 224, and antenna panels 226 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 214 may include one or more instances of control circuitry (not shown) to provide control functions for the transmit/receive components.

A UE reception may be established by and via the antenna panels 226, RFFE 224, RF circuitry 222, receive circuitry 220, digital baseband circuitry 216, and protocol processing circuitry 214. In some embodiments, the antenna panels 226 may receive a transmission from the AN 204 by receive-beamforming signals received by a plurality of antennas/antenna elements of the one or more antenna panels 226.

A UE transmission may be established by and via the protocol processing circuitry 214, digital baseband circuitry 216, transmit circuitry 218, RF circuitry 222, RFFE 224, and antenna panels 226. In some embodiments, the transmit components of the UE 204 may apply a spatial filter to the data to be transmitted to form a transmit beam emitted by the antenna elements of the antenna panels 226.

Similar to the UE 202, the AN 204 may include a host platform 228 coupled with a modem platform 230. The host platform 228 may include application processing circuitry 232 coupled with protocol processing circuitry 234 of the modem platform 230. The modem platform may further include digital baseband circuitry 236, transmit circuitry 238, receive circuitry 240, RF circuitry 242, RFFE circuitry 244, and antenna panels 246. The components of the AN 204 may be similar to and substantially interchangeable with like-named components of the UE 202. In addition to performing data transmission/reception as described above, the components of the AN 208 may perform various logical functions that include, for example, RNC functions such as radio bearer management, uplink and downlink dynamic radio resource management, and data packet scheduling.

Figure 3:
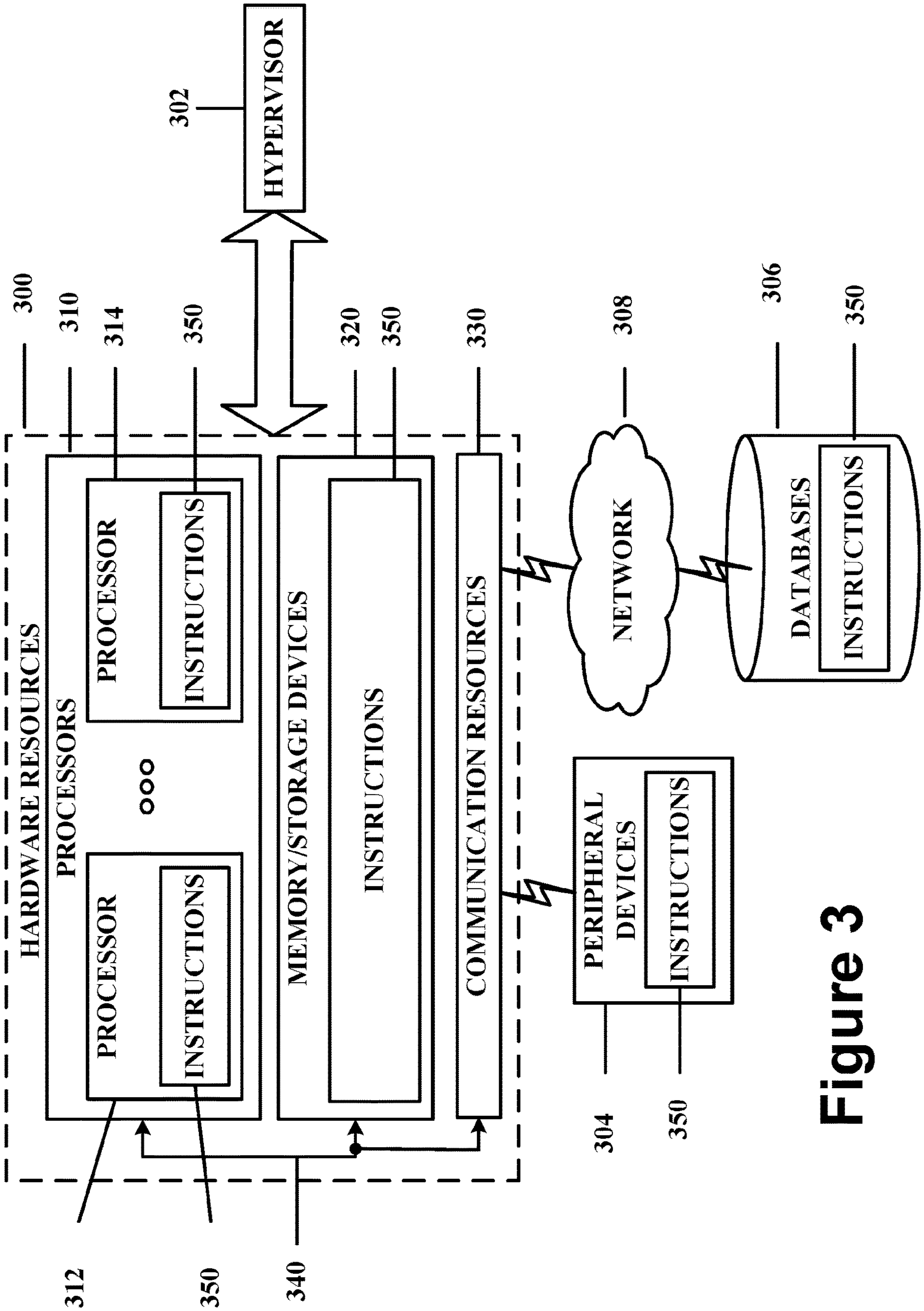
FIG. 3 is a block diagram illustrating components, according to some example embodiments, able to read instructions from a machine-readable or computer-readable medium (e.g., a non-transitory machine-readable storage medium) and perform any one or more of the methodologies discussed herein.

FIG. 3 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 3 shows a diagrammatic representation of hardware resources 300 including one or more processors (or processor cores) 310, one or more memory/storage devices 320, and one or more communication resources 330, each of which may be communicatively coupled via a bus 340 or other interface circuitry. For embodiments where node virtualization (e.g., NFV) is utilized, a hypervisor 302 may be executed to provide an execution environment for one or more network slices/sub-slices to utilize the hardware resources 300.

The processors 310 may include, for example, a processor 312 and a processor 314. The processors 310 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 320 may include main memory, disk storage, or any suitable combination thereof. The memory/storage devices 320 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 330 may include interconnection or network interface controllers, components, or other suitable devices to communicate with one or more peripheral devices 304 or one or more databases 306 or other network elements via a network 308. For example, the communication resources 330 may include wired communication components (e.g., for coupling via USB, Ethernet, etc.), cellular communication components, NFC components, Bluetooth® (or Bluetooth® Low Energy) components, Wi-Fi® components, and other communication components.

Instructions 350 may comprise software, a program, an application, an applet, an app, or other executable code for causing at least any of the processors 310 to perform any one or more of the methodologies discussed herein. The instructions 350 may reside, completely or partially, within at least one of the processors 310 (e.g., within the processor's cache memory), the memory/storage devices 320, or any suitable combination thereof. Furthermore, any portion of the instructions 350 may be transferred to the hardware resources 300 from any combination of the peripheral devices 304 or the databases 306. Accordingly, the memory of processors 310, the memory/storage devices 320, the peripheral devices 304, and the databases 306 are examples of computer-readable and machine-readable media.

Figure 4:
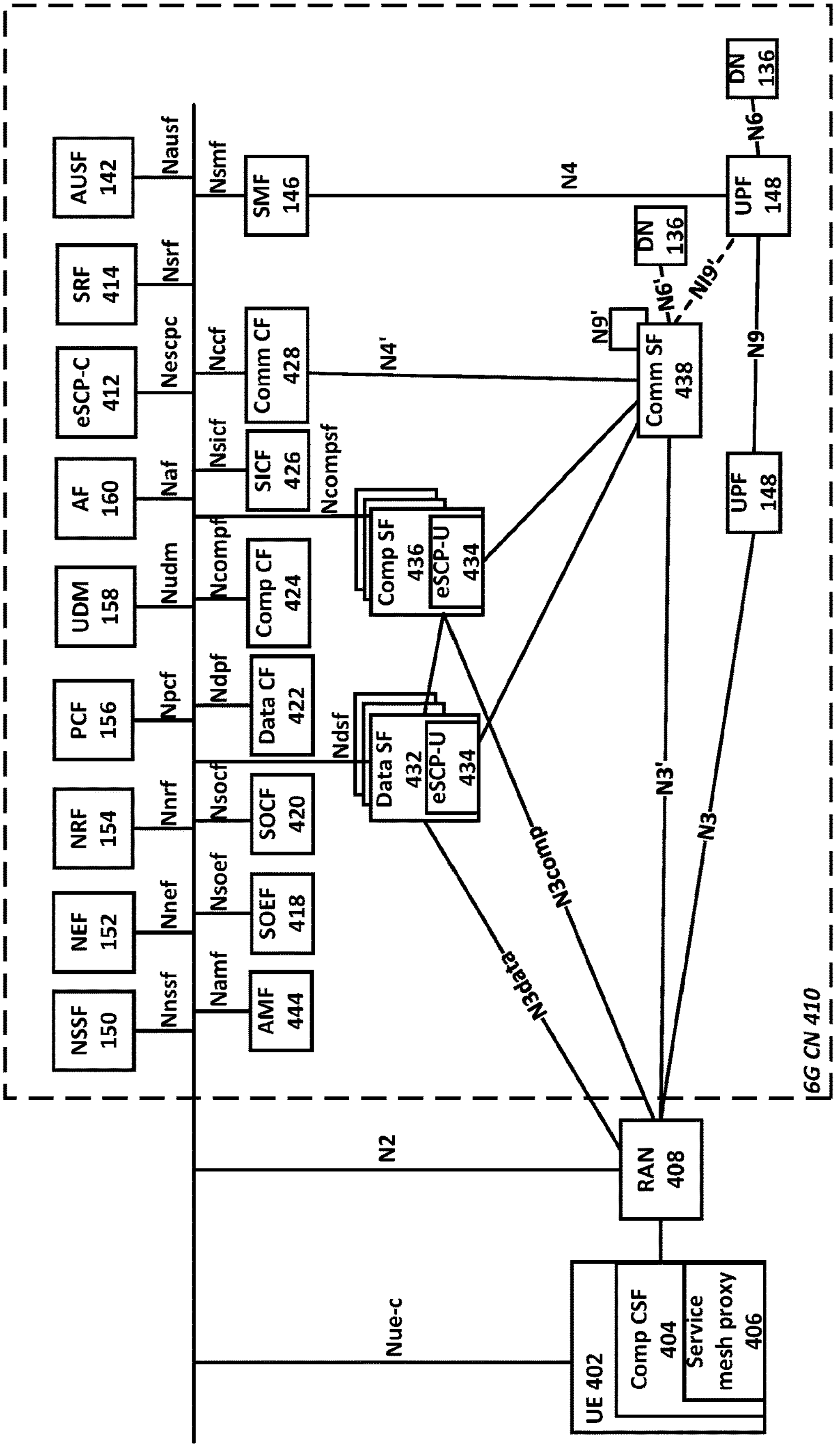
FIG. 4 schematically illustrates an alternative wireless network in accordance with various embodiments.

FIG. 4 illustrates a network 400 in accordance with various embodiments. The network 400 may operate in a matter consistent with 3GPP technical specifications or technical reports for 6G systems. In some embodiments, the network 400 may operate concurrently with network 100. For example, in some embodiments, the network 400 may share one or more frequency or bandwidth resources with network 100. As one specific example, a UE (e.g., UE 402) may be configured to operate in both network 400 and network 100. Such configuration may be based on a UE including circuitry configured for communication with frequency and bandwidth resources of both networks 100 and 400. In general, several elements of network 400 may share one or more characteristics with elements of network 100. For the sake of brevity and clarity, such elements may not be repeated in the description of network 400.

The network 400 may include a UE 402, which may include any mobile or non-mobile computing device designed to communicate with a RAN 408 via an over-the-air connection. The UE 402 may be similar to, for example, UE 102. The UE 402 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

Although not specifically shown in FIG. 4, in some embodiments the network 400 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc. Similarly, although not specifically shown in FIG. 4, the UE 402 may be communicatively coupled with an AP such as AP 106 as described with respect to FIG. 1. Additionally, although not specifically shown in FIG. 4, in some embodiments the RAN 408 may include one or more ANss such as AN 108 as described with respect to FIG. 1. The RAN 408 and/or the AN of the RAN 408 may be referred to as a base station (BS), a RAN node, or using some other term or name.

The UE 402 and the RAN 408 may be configured to communicate via an air interface that may be referred to as a sixth generation (6G) air interface. The 6G air interface may include one or more features such as communication in a terahertz (THz) or sub-THz bandwidth, or joint communication and sensing. As used herein, the term "joint communication and sensing" may refer to a system that allows for wireless communication as well as radar-based sensing via various types of multiplexing. As used herein, THz or sub-THz bandwidths may refer to communication in the 80 GHz and above frequency ranges. Such frequency ranges may additionally or alternatively be referred to as "millimeter wave" or "mmWave" frequency ranges.

The RAN 408 may allow for communication between the UE 402 and a 6G core network (CN) 410. Specifically, the RAN 408 may facilitate the transmission and reception of data between the UE 402 and the 6G CN 410. The 6G CN 410 may include various functions such as NSSF 150, NEF 152, NRF 154, PCF 156, UDM 158, AF 160, SMF 146, and AUSF 142. The 6G CN 410 may additional include UPF 148 and DN 136 as shown in FIG. 4.

Additionally, the RAN 408 may include various additional functions that are in addition to, or alternative to, functions of a legacy cellular network such as a 4G or 5G network. Two such functions may include a Compute Control Function (Comp CF) 424 and a Compute Service Function (Comp SF) 436. The Comp CF 424 and the Comp SF 436 may be parts or functions of the Computing Service Plane. Comp CF 424 may be a control plane function that provides functionalities such as management of the Comp SF 436, computing task context generation and management (e.g., create, read, modify, delete), interaction with the underlaying computing infrastructure for computing resource management, etc. Comp SF 436 may be a user plane function that serves as the gateway to interface computing service users (such as UE 402) and computing nodes behind a Comp SF instance. Some functionalities of the Comp SF 436 may include: parse computing service data received from users to compute tasks executable by computing nodes; hold service mesh ingress gateway or service API gateway; service and charging policies enforcement; performance monitoring and telemetry collection, etc. In some embodiments, a Comp SF 436 instance may serve as the user plane gateway for a cluster of computing nodes. A Comp CF 424 instance may control one or more Comp SF 436 instances.

Two other such functions may include a Communication Control Function (Comm CF) 428 and a Communication Service Function (Comm SF) 438, which may be parts of the Communication Service Plane. The Comm CF 428 may be the control plane function for managing the Comm SF 438, communication sessions creation/configuration/releasing, and managing communication session context. The Comm SF 438 may be a user plane function for data transport. Comm CF 428 and Comm SF 438 may be considered as upgrades of SMF 146 and UPF 148, which were described with respect to a 5G system in FIG. 1. The upgrades provided by the Comm CF 428 and the Comm SF 438 may enable service-aware transport. For legacy (e.g., 4G or 5G) data transport, SMF 146 and UPF 148 may still be used. Two other such functions may include a Data Control Function (Data CF) 422 and Data Service Function (Data SF) 432 may be parts of the Data Service Plane. Data CF 422 may be a control plane function and provides functionalities such as Data SF 432 management, Data service creation/configuration/releasing, Data service context management, etc. Data SF 432 may be a user plane function and serve as the gateway between data service users (such as UE 402 and the various functions of the 6G CN 410) and data service endpoints behind the gateway. Specific functionalities may include include: parse data service user data and forward to corresponding data service endpoints, generate charging data, report data service status.

Another such function may be the Service Orchestration and Chaining Function (SOCF) 420, which may discover, orchestrate and chain up communication/computing/data services provided by functions in the network. Upon receiving service requests from users, SOCF 420 may interact with one or more of Comp CF 424, Comm CF 428, and Data CF 422 to identify Comp SF 436, Comm SF 438, and Data SF 432 instances, configure service resources, and generate the service chain, which could contain multiple Comp SF 436, Comm SF 438, and Data SF 432 instances and their associated computing endpoints. Workload processing and data movement may then be conducted within the generated service chain. The SOCF 420 may also responsible for maintaining, updating, and releasing a created service chain.

Another such function may be the service registration function (SRF) 414, which may act as a registry for system services provided in the user plane such as services provided by service endpoints behind Comp SF 436 and Data SF 432 gateways and services provided by the UE 402. The SRF 414 may be considered a counterpart of NRF 154, which may act as the registry for network functions.

Other such functions may include an evolved service communication proxy (eSCP) and service infrastructure control function (SICF) 426, which may provide service communication infrastructure for control plane services and user plane services. The eSCP may be related to the service communication proxy (SCP) of 5G with user plane service communication proxy capabilities being added. The eSCP is therefore expressed in two parts: eCSP-C 412 and eSCP-U 434, for control plane service communication proxy and user plane service communication proxy, respectively. The SICF 426 may control and configure eCSP instances in terms of service traffic routing policies, access rules, load balancing configurations, performance monitoring, etc.

Another such function is the AMF 444. The AMF 444 may be similar to 144, but with additional functionality. Specifically, the AMF 444 may include potential functional repartition, such as move the message forwarding functionality from the AMF 444 to the RAN 408.

Another such function is the service orchestration exposure function (SOEF) 418. The SOEF may be configured to expose service orchestration and chaining services to external users such as applications.

The UE 402 may include an additional function that is referred to as a computing client service function (comp CSF) 404. The comp CSF 404 may have both the control plane functionalities and user plane functionalities, and may interact with corresponding network side functions such as SOCF 420, Comp CF 424, Comp SF 436, Data CF 422, and/or Data SF 432 for service discovery, request/response, compute task workload exchange, etc. The Comp CSF 404 may also work with network side functions to decide on whether a computing task should be run on the UE 402, the RAN 408, and/or an element of the 6G CN 410.

The UE 402 and/or the Comp CSF 404 may include a service mesh proxy 406. The service mesh proxy 406 may act as a proxy for service-to-service communication in the user plane. Capabilities of the service mesh proxy 406 may include one or more of addressing, security, load balancing, etc.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Example Procedures

Figure 5:
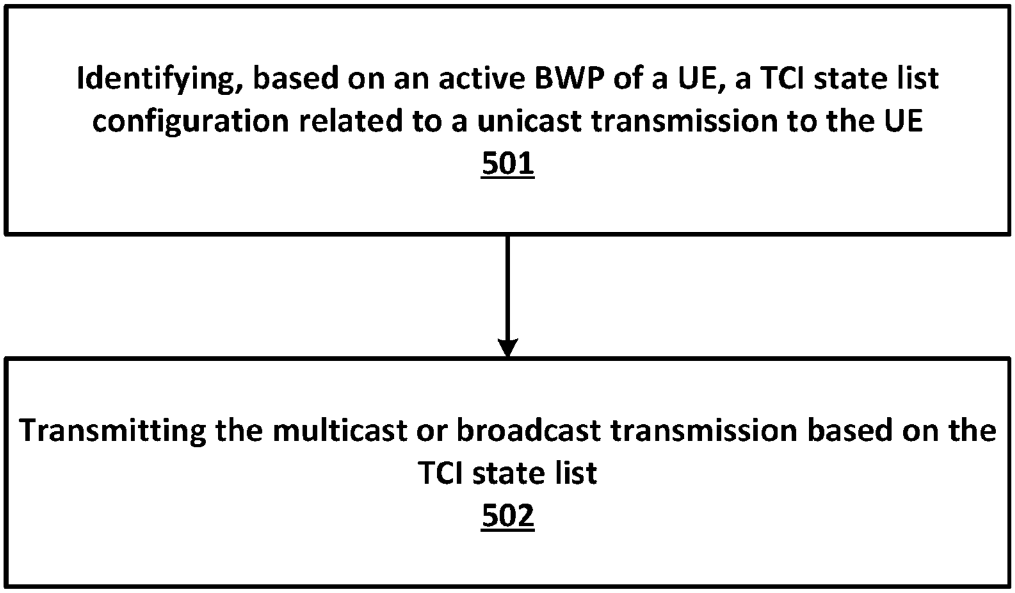
FIG. 5 illustrates an example technique, in accordance with embodiments herein.

In some embodiments, the electronic device(s), network (s), system(s), chip(s) or component(s), or portions or implementations thereof, of FIGS. 1-4, or some other figure herein, may be configured to perform one or more processes, techniques, or methods as described herein, or portions thereof. One such process is depicted in FIG. 5. The process of FIG. 5 may include or relate to a process to be performed by a base station of a cellular network (e.g., a gNodeB or gNB), one or more elements of a base station, and/or an electronic device that includes and/or implements a base station. The process may include identifying, at 501 based on an active bandwidth part (BWP) of a user equipment (UE), a transmission control indicator (TCI) state list configuration related to a unicast transmission to the UE; and transmitting, at 502, the multicast or broadcast transmission based on the TCI state list.

Figure 6:
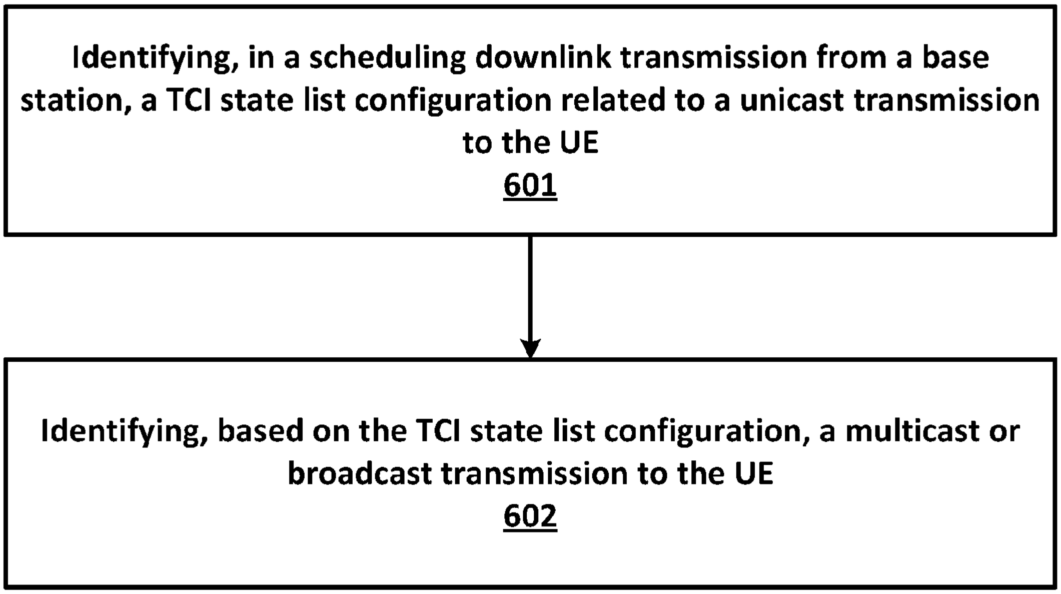
FIG. 6 illustrates an alternative example technique, in accordance with embodiments herein.

Another such process is depicted in FIG. 6. The process of FIG. 6 may include or relate to a process to be performed by a user equipment (UE) of a cellular network, one or more elements of a UE, and/or an electronic device that includes and/or implements a UE. The process may include identifying, at 601 in a scheduling downlink transmission from a base station, a transmission control indicator (TCI) state list configuration related to a unicast transmission to the UE; and identifying, at 602 based on the TCI state list configuration, a multicast or broadcast transmission to the UE.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 may include a method for reception of a multicast PDSCH scheduled by DCI format 4_1/4_2 in cell enabled with UE processing capability 1, and a unicast PDSCH which can be a PDSCH scheduled by DCI formats 1_1/1_2 or an SPS-PDSCH in a cell enabled with UE processing capability 2.

Example 2 may include the method of example 1 or some other example herein, wherein, a UE may not be expected to be scheduled with a unicast PDSCH which starts X symbols before the end of the multicast PDSCH where the value of X is given by the UE processing capability 1 timeline based on subcarrier spacing provided in Table 5.3-1 of TS 38.214.

Example 3 may include the method of example 1 or some other example herein, wherein, a UE can skip decoding multiple multicast PDSCHs with UE processing capability 1 which have last symbols within X symbols of a unicast PDSCH with UE processing capability 2.

Example 4 may include the methods of examples 1 and 3 or some other example herein, wherein a UE may be expected to provide a NACK for one or more multicast PDSCHs which were not decoded due to dropping Example 5 may include the methods of examples 1, 3, 4 or some other example herein, wherein a UE is expected to report a NACK for the dropped multicast PDSCHs only if NACK-only feedback is configured for multicast and is not expected to provide HARQ-ACK feedback if ACK/NACK based feedback is configured Example 6 may include the methods of examples 1-5 or some other example herein, wherein the methods may be applied to a UE that does not indicate capability of simultaneous reception of unicast and multicast PDSCHs such that the unicast and multicast PDSCHs overlap in at least one OFDM symbol but are multiplexed via frequency domain multiplexing (FDM).

Example 7 may include the methods of examples 1-6 or some other example herein, wherein, if a UE indicates capability for receiving frequency domain multiplexed unicast PDSCH and multicast PDSCH, when scheduled with a multicast PDSCH in a cell configured with UE processing capability 2, the UE does not expect to be scheduled with more than one unicast PDSCH to follow UE processing capability where the first symbol of the unicast PDSCH associated with capability 2 starts before X symbols from the last symbol of the multicast PDSCH wherein X is defined similar to the previous claims Example 8 may include the methods of examples 1-7 or some other example herein, wherein if a UE indicates capability for receiving frequency domain multiplexed unicast PDSCH and multicast PDSCH, when scheduled with one or more multicast PDSCHs in a cell with UE processing time capability 2 is enabled, the UE may be expected to receive at most one and skip decoding a number of multicast PDSCHs with last symbol within X symbols before the start of a PDSCH to follow capability 2.

Example 9 may include a method for reception of multicast and broadcast group-common PDSCH scheduled by group-common PDCCH formats 4_0/4_1/4_2 wherein, for reception of the muticast or broadcast PDSCH, the UE is expected to use the TCI state list configuration from PDSCH-Config for unicast provided in the BWP configuration of the active BWP for UE which contains the CFR in which the multicast or broadcast transmission is scheduled.

Example 10 may include the method of example 9 or some other example herein, wherein for RRC_CONNECTED UEs, for the period between RRC configuration of TCI state list and before the activation of the TCI takes effect e.g., before the time threshold when an activated TI state can be applied, the default multicast/broadcast PDSCH beam follows the beam of the CORESET with the lowest index contained within the BWP containing the CFR.

Example 11 may include the method of example 9 or some other example herein, wherein for RRC_IDLE/INACTIVE UEs, the default beam for the reception of a broadcast PDSCH scheduled by DCI format 4_0 within the configured CFR should be identical to the beam for CORESET with index 0 which is quasi co-located with an SS/PBCH block.

Example 12 may include a method for when a UE is provided fdmed-Reception-Multicast and if a unicast SPS PDSCH and multicast SPS PDSCH overlap in frequency, the UE may be expected to receive the multicast SPS PDSCH and may skip decoding the unicast SPS PDSCH. Alternately, the UE may be expected to receive the unicast SPS PDSCH and may skip decoding the multicast SPS PDSCH.

Example 13 may include the methods of example 12 or some other example herein, wherein, in case of time domain overlaps involving more than one multicast SPS PDSCHs or more than one unicast SPS PDSCHs, the above unicast and multicast PDSCHs could be the final PDSCHs after resolving collisions within the set of overlapping multicast SPS PDSCHs and within the set of overlapping unicast SPS PDSCHs.

Example 14 may include the method of example 12 or some other example herein, wherein, in case of time domain overlaps involving more than one multicast SPS PDSCHs or more than one unicast SPS PDSCHs, UE may be expected to receive one multi-cast SPS PDSCH with the lowest SPS configuration index. In another option, in case of time domain overlaps involving more than one multicast SPS PDSCHs or more than one unicast SPS PDSCHs, UE may be expected to receive one unicast SPS PDSCH with the lowest SPS configuration index.

Example 15 may include a method to be performed by a base station in a cellular network, one or more elements of a base station, and/or an electronic device that includes and/or implements a base station, wherein the method comprises: identifying, based on an active bandwidth part (BWP) of a user equipment (UE), a transmission control indicator (TCI) state list configuration related to a unicast transmission to the UE; and transmitting the multicast or broadcast transmission based on the TCI state list.

Example 16 may include the method of example 15, and/or some other example herein, wherein the multicast or broadcast transmission is a physical downlink shared channel (PDSCH) transmission.

Example 17 may include the method of any of examples 15-16, and/or some other example herein, wherein the multicast or broadcast transmission is scheduled by a group-common physical downlink control channel (PDCCH) transmission.

Example 18 may include the method of example 17, and/or some other example herein, wherein the PDCCH transmission is a PDCCH format 4_0, 4_1, or 4_2 transmission.

Example 19 may include the method of any of examples 15-18, and/or some other example herein, wherein the TCI state list configuration is an element of a PDSCH-Config transmission.

Example 20 may include the method of example 19, and/or some other example herein, wherein the PDSCH-Config is provided in a BWP configuration of the active BWP.

Example 21 may include the method of any of examples 15-20, and/or some other example herein, wherein the active BWP is a BWP that contains a common frequency resource (CFR) in which the multicast or broadcast transmission is scheduled.

Example 22 may include a method to be performed by a user equipment (UE) in a cellular network, one or more elements of a UE, and/or an electronic device that includes and/or implements a UE, wherein the method comprises identifying, in a scheduling downlink transmission from a base station, a transmission control indicator (TCI) state list configuration related to a unicast transmission to the UE; and identifying, based on the TCI state list configuration, a multicast or broadcast transmission to the UE.

Example 23 may include the method of example 22, and/or some other example herein, wherein the multicast or broadcast transmission is a physical downlink shared channel (PDSCH) transmission.

Example 24 may include the method of any of examples 22-23, and/or some other example herein, wherein the scheduling downlink transmission is a group-common physical downlink control channel (PDCCH) transmission.

Example 25 may include the method of example 24, and/or some other example herein, wherein the PDCCH transmission is a PDCCH format 4_0, 4_1, or 4_2 transmission.

Example 26 may include the method of any of examples 22-25, and/or some other example herein, wherein the TCI state list configuration is an element of a PDSCH-Config transmission.

Example 27 may include the method of example 26, and/or some other example herein, wherein the PDSCH-Config transmission is provided in a bandwidth part (BWP) configuration of an active BWP of the UE.

Example Z01 may include an apparatus comprising means to perform one or more elements of a method described in or related to any of examples 1-27, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples 1-27, or any other method or process described herein.

Example Z03 may include an apparatus comprising logic, modules, or circuitry to perform one or more elements of a method described in or related to any of examples 1-27, or any other method or process described herein.

Example Z04 may include a method, technique, or process as described in or related to any of examples 1-27, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples 1-27, or portions thereof.

Example Z06 may include a signal as described in or related to any of examples 1-27, or portions or parts thereof.

Example Z07 may include a datagram, packet, frame, segment, protocol data unit (PDU), or message as described in or related to any of examples 1-27, or portions or parts thereof, or otherwise described in the present disclosure.

Example Z08 may include a signal encoded with data as described in or related to any of examples 1-27, or portions or parts thereof, or otherwise described in the present disclosure.

Example Z09 may include a signal encoded with a datagram, packet, frame, segment, protocol data unit (PDU), or message as described in or related to any of examples 1-27, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples 1-27, or portions thereof.

Example Z11 may include a computer program comprising instructions, wherein execution of the program by a processing element is to cause the processing element to carry out the method, techniques, or process as described in or related to any of examples 1-27, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

Unless used differently herein, terms, definitions, and abbreviations may be consistent with terms, definitions, and abbreviations defined in 3GPP TR 21.905 v16.0.0 (2019-06). For the purposes of the present document, the following abbreviations may apply to the examples and embodiments discussed herein.

3GPP Third Generation Partnership Project
4G FourthGeneration
5G Fifth Generation
5GC 5G Core network
AC Application Client
ACR Application Context Relocation
ACK Acknowledgement
ACID Application Client Identification
AF Application Function
AM Acknowledged Mode
AMBRAggregate Maximum Bit Rate
AMF Access and Mobility Management Function
AN Access Network
ANR Automatic Neighbour Relation
AOA Angle of Arrival
AP Application Protocol, Antenna Port, Access Point
API Application Programming Interface
APN Access Point Name
ARP Allocation and Retention Priority
ARQ Automatic Repeat Request
AS Access Stratum
ASP Application Service Provider
ASN.1 Abstract Syntax Notation One
AUSF Authentication Server Function
AWGN Additive White Gaussian Noise
BAP Backhaul Adaptation Protocol
BCH Broadcast Channel
BER Bit Error Ratio
BFD Beam Failure Detection
BLER Block Error Rate
BPSK Binary Phase Shift Keying
BRAS Broadband Remote Access Server
BSS Business Support System
BS Base Station
BSR Buffer Status Report
BW Bandwidth
BWP Bandwidth Part
C-RNTI Cell Radio Network Temporary Identity
CA Carrier Aggregation, Certification Authority
CAPEX CAPital EXpenditure
CBRA Contention Based Random Access
CC Component Carrier, Country Code, Cryptographic Checksum
CCA Clear Channel Assessment -continued CCE Control Channel Element
CCCH Common Control Channel
CE Coverage Enhancement
CDM Content Delivery Network
CDMA Code-Division Multiple Access
CDR Charging Data Request
CDR Charging Data Response
CFRA Contention Free Random Access
CG Cell Group
CGF Charging Gateway Function
CHF Charging Function
CI Cell Identity
CID Cell-ID (e.g., positioning method)
CIM Common Information Model
CIR Carrier to Interference Ratio
CK Cipher Key
CM Connection Management, Conditional Mandatory
CMAS Commercial Mobile Alert Service
CMD Command
CMS Cloud Management System
CO Conditional Optional
CoMP Coordinated Multi-Point
CORESET Control Resource Set
COTS Commercial Off-The-Shelf
CP Control Plane, Cyclic Prefix, Connection Point
CPD Connection Point Descriptor
CPE Customer Premise Equipment
CPICHCommon Pilot Channel
CQI Channel Quality Indicator
CPU CSI processing unit, Central Processing Unit
C/R Command/Response field bit
CRAN Cloud Radio Access Network, Cloud RAN
CRB Common Resource Block
CRC Cyclic Redundancy Check
CRI Channel-State Information Resource Indicator,
CSI-RS Resource Indicator
C-RNTI Cell RNTI
CS Circuit Switched
CSCF call session control function
CSAR Cloud Service Archive
CSI Channel-State Information
CSI-IM CSI Interference Measurement
CSI-RS CSI Reference Signal
CSI-RSRP CSI reference signal received power
CSI-RSRQ CSI reference signal received quality
CSI-SINR CSI signal-to-noise and interference ratio
CSMA Carrier Sense Multiple Access
CSMA/CA CSMA with collision avoidance
CSS Common Search Space, Cell-specific Search Space
CTF Charging Trigger Function
CTS Clear-to-Send
CW Codeword
CWS Contention Window Size
D2D Device-to-Device
DC Dual Connectivity, Direct Current
DCI Downlink Control Information
DF Deployment Flavour
DL Downlink
DMTF Distributed Management Task Force
DPDK Data Plane Development Kit
DM-RS, DMRS Demodulation Reference Signal
DN Data network
DNN Data Network Name
DNAI Data Network Access Identifier
DRB Data Radio Bearer
DRS Discovery Reference Signal
DRX Discontinuous Reception
DSL Domain Specific Language. Digital Subscriber Line
DSLAM DSL Access Multiplexer
DwPTS Downlink Pilot Time Slot
E-LAN Ethernet Local Area Network
E2E End-to-End
EAS Edge Application Server
ECCA extended clear channel assessment, extended CCA
ECCE Enhanced Control Channel Element, Enhanced CCE
ED Energy Detection
EDGE Enhanced Datarates for GSM Evolution (GSM Evolution)
EAS Edge Application Server
EASID Edge Application Server Identification -continued ECS Edge Configuration Server
ECSP Edge Computing Service Provider
EDN Edge Data Network
EEC Edge Enabler Client
EECID Edge Enabler Client Identification
EES Edge Enabler Server
EESID Edge Enabler Server Identification
EHE Edge Hosting Environment
EGMF Exposure Governance Management Function
EGPRS Enhanced GPRS
EIR Equipment Identity Register
eLAA enhanced Licensed Assisted Access, enhanced LAA
EM Element Manager
eMBB Enhanced Mobile Broadband
EMS Element Management System
eNB evolved NodeB, E-UTRAN Node B
EN-DC E-UTRA-NR Dual Connectivity
EPC Evolved Packet Core
EPDCCH enhanced PDCCH, enhanced Physical Downlink Control Cannel
EPRE Energy per resource element
EPS Evolved Packet System
EREG enhanced REG, enhanced resource element groups
ETSI European Telecommunications Standards Institute
ETWS Earthquake and Tsunami Warning System
eUICC embedded UICC, embedded Universal Integrated Circuit Card
E-UTRA Evolved UTRA
E-UTRAN Evolved UTRAN
EV2X Enhanced V2X
F1AP F1 Application Protocol
F1-C F1 Control plane interface
F1-U F1 User plane interface
FACCH Fast Associated Control CHannel
FACCH/F Fast Associated Control Channel/Full rate
FACCH/H Fast Associated Control Channel/Half rate
FACH Forward Access Channel
FAUSCH Fast Uplink Signalling Channel
FB Functional Block
FBI Feedback Information
FCC Federal Communications Commission
FCCH Frequency Correction CHannel
FDD Frequency Division Duplex
FDM Frequency Division Multiplex
FDMA Frequency Division Multiple Access
FE Front End
FEC Forward Error Correction
FFS For Further Study
FFT Fast Fourier Transformation
feLAA further enhanced Licensed Assisted Access, further enhanced LAA
FN Frame Number
FPGA Field-Programmable Gate Array
FR Frequency Range
FQDN Fully Qualified Domain Name
G-RNTI GERAN Radio Network Temporary Identity
GERAN GSM EDGE RAN, GSM EDGE Radio Access Network
GGSN Gateway GPRS Support Node
GLONASS GLObal'naya NAvigatsionnaya Sputnikovaya Sistema (Engl.: Global Navigation Satellite System)
gNB Next Generation NodeB
gNB-CU gNB-centralized unit, Next Generation NodeB centralized unit
gNB-DU gNB-distributed unit, Next Generation NodeB distributed unit
GNSS Global Navigation Satellite System
GPRS General Packet Radio Service
GPSI Generic Public Subscription Identifier
GSM Global System for Mobile Communications, Groupe Spécial Mobile
GTP GPRS Tunneling Protocol
GTP-UGPRS Tunnelling Protocol for User Plane
GTS Go To Sleep Signal (related to WUS)
GUMMEI Globally Unique MME Identifier
GUTI Globally Unique Temporary UE Identity
HARQ Hybrid ARQ, Hybrid Automatic Repeat Request
HANDO Handover
HFN HyperFrame Number
HHO Hard Handover
HLR Home Location Register
HN Home Network
HO Handover
HPLMN Home Public Land Mobile Network
HSDPA High Speed Downlink Packet Access
HSN Hopping Sequence Number -continued HSPA High Speed Packet Access
HSS Home Subscriber Server
HSUPA High Speed Uplink Packet Access
HTTP Hyper Text Transfer Protocol
HTTPS Hyper Text Transfer Protocol Secure
(https is http/1.1 over SSL, i.e. port 443)
I-Block Information Block
ICCID Integrated Circuit Card Identification
IAB Integrated Access and Backhaul
ICIC Inter-Cell Interference Coordination
ID Identity, identifier
IDFT Inverse Discrete Fourier Transform
IE Information element
IBE In-Band Emission
IEEE Institute of Electrical and Electronics Engineers
IEI Information Element Identifier
IEIDL Information Element Identifier Data Length
IETF Internet Engineering Task Force
IF Infrastructure
IIOT Industrial Internet of Things
IM Interference Measurement, Intermodulation, IP Multimedia
IMC IMS Credentials
IMEI International Mobile Equipment Identity
IMGI International mobile group identity
IMPI IP Multimedia Private Identity
IMPU IP Multimedia PUblic identity
IMS IP Multimedia Subsystem
IMSI International Mobile Subscriber Identity
IT Internet of Things
IP Internet Protocol
Ipsec IP Security, Internet Protocol Security
IP-CAN IP-Connectivity Access Network
IP-M IP Multicast
IPv4 Internet Protocol Version 4
IPv6 Internet Protocol Version 6
IR Infrared
IS In Sync
IRP Integration Reference Point
ISDN Integrated Services Digital Network
ISIM IM Services Identity Module
ISO International Organisation for Standardisation
ISP Internet Service Provider
IWF Interworking-Function
I-WLAN Interworking WLAN Constraint length of the convolutional code, USIM Individual key
kB Kilobyte (1000 bytes)
kbps kilo-bits per second
Kc Ciphering key
Ki Individual subscriber authentication key
KPI Key Performance Indicator
KQI Key Quality Indicator
KSI Key Set Identifier
ksps kilo-symbols per second
KVM Kernel Virtual Machine
L1 Layer 1 (physical layer)
L1-RSRP Layer 1 reference signal received power
L2 Layer 2 (data link layer)
L3 Layer 3 (network layer)
LAA Licensed Assisted Access
LAN Local Area Network
LADN Local Area Data Network
LBT Listen Before Talk
LCM LifeCycle Management
LCR Low Chip Rate
LCS Location Services
LCID Logical Channel ID
LI Layer Indicator
LLC Logical Link Control, Low Layer Compatibility
LMF Location Management Function
LOS Line of Sight
LPLMN Local PLMN
LPP LTE Positioning Protocol
LSB Least Significant Bit
LTE Long Term Evolution
LWA LTE-WLAN aggregation
LWIP LTE/WLAN Radio Level Integration with IPsec Tunnel
LTE Long Term Evolution
M2M Machine-to-Machine
MAC Medium Access Control (protocol layering context)

-continued

MAC Message authentication code (security/encryption context)
MAC-A MAC used for authentication and key agreement (TSG TWG3 context)
MAC-IMAC used for data integrity of signalling messages (TSG T WG3 context)
MANO Management and Orchestration
MBMS Multimedia Broadcast and Multicast Service
MBSFN Multimedia Broadcast multicast service Single Frequency Network
MCC Mobile Country Code
MCG Master Cell Group
MCOT Maximum Channel Occupancy Time
MCS Modulation and coding scheme
MDAF Management Data Analytics Function
MDAS Management Data Analytics Service
MDT Minimization of Drive Tests
ME Mobile Equipment
MeNB master eNB
MER Message Error Ratio
MGL Measurement Gap Length
MGRP Measurement Gap Repetition Period
MIB Master Information Block, Management Information Base
MIMO Multiple Input Multiple Output
MLC Mobile Location Centre
MM Mobility Management
MME Mobility Management Entity
MN Master Node
MNO Mobile Network Operator
MO Measurement Object, Mobile Originated
MPBCH MTC Physical Broadcast CHannel
MPDCCH MTC Physical Downlink Control CHannel
MPDSCH MTC Physical Downlink Shared CHannel
MPRACH MTC Physical Random Access CHannel
MPUSCH MTC Physical Uplink Shared Channel
MPLS MultiProtocol Label Switching
MS Mobile Station
MSB Most Significant Bit
MSC Mobile Switching Centre
MSI Minimum System Information, MCH Scheduling Information
MSID Mobile Station Identifier
MSIN Mobile Station identification Number
MISISDN Mobile Subscriber ISDN Number
MT Mobile Terminated, Mobile Termination
MTC Machine-Type Communications
mMTCmassive MTC, massive Machine-Type Communications
MU-MIMO Multi Uswer MIMO
MWUS MTC wake-up signal, MTC WUS
NACK Negative Acknowledgement
NAI Network Access Identifier
NAS Non-Access Stratum, Non-Access Stratum layer
NCT Network Connectivity Topology
NC-JT Non-Coherent Joint Transmission
NEC Network Capability Exposure
NE-DC NR-E-UTRA Dual Connectivity
NEF Network Exposure Function
NF Netowrk Function
NFP Network Forwarding Path
NFPD Network Forwarding Path Descriptor
NFV Network Functions Virtualization
NFVI NFV Infrastructure
NFVO NFV Orchestrator
NG Next Generation, Next Gen
NGEN-DC NG-RAN E-UTRA-NR Dual Connectivity
NM Network Manager
NMS Network Management System
N-PoP Network Point of Presence
NMIB, N-MIB Narrowband MIB
NPBCH Narrowband Physical Broadcast CHannel
NPDCCH Narrowband Physical Downlink Control CHannel
NPDSCH Narrowband Physical Downlink Shared CHannel
NPRACH Narrowband Physical Random Access CHannel
NPUSCH Narrowband Physical Uplink Shared CHannel
NPSS Narrowband Primary Synchronization Signal
NSSS Narrowband Secondary Synchronization Signal
NR New Radio, Neighbour Relation
NRF NF Repository Function
NRS Narrowband Reference Signal
NS Network Service
NSA Non-Standalone operation mode -continued NSD Network Service Descriptor
NSR Network Service Record
NSSAINetwork Slice Selection Assistance Information S-NNSAI Single-NSSAI
NSSF Network Slice Selection Function
NW Network
NWUSNarrowband wake-up signal, Narrowband WUS
NZP Non-Zero Power
O&M Operation and Maintenance
ODU2 Optical channel Data Unit-type 2
OFDM Orthogonal Frequency Division Multiplexing
OFDMA Orthogonal Frequency Division Multiple Access
OOB Out-of-band
OOS Out of Sync
OPEX OPerating EXpense
OSI Other System Information
OSS Operations Support System
OTA over-the-air
PAPR Peak-to-Average Power Ratio
PAR Peak to Average Ratio
PBCH Physical Broadcast Channel
PC Power Control, Personal Computer
PCC Primary Component Carrier, Primary CC
P-CSCF Proxy CSCF
PCell Primary Cell
PCI Physical Cell ID, Physical Cell Identity
PCEF Policy and Charging Enforcement Function
PCF Policy Control Function
PCRF Policy Control and Charging Rules Function
PDCP Packet Data Convergence Protocol, Packet Data Convergence Protocol layer
PDCCH Physical Downlink Control Channel
PDCP Packet Data Convergence Protocol
PDN Packet Data Network, Public Data Network
PDSCH Physical Downlink Shared Channel
PDU Protocol Data Unit
PEI Permanent Equipment Identifiers
PFD Packet Flow Description
P-GW PDN Gateway
PHICH Physical hybrid-ARQ indicator channel
PHY Physical layer
PLMN Public Land Mobile Network
PIN Personal Identification Number
PM Performance Measurement
PMI Precoding Matrix Indicator
PNF Physical Network Function
PNFD Physical Network Function Descriptor
PNFR Physical Network Function Record
POC PTT over Cellular
PP, PTP Point-to-Point
PPP Point-to-Point Protocol
PRACH Physical RACH
PRB Physical resource block
PRG Physical resource block group
ProSe Proximity Services, Proximity-Based Service
PRS Positioning Reference Signal
PRR Packet Reception Radio
PS Packet Services
PSBCH Physical Sidelink Broadcast Channel
PSDCH Physical Sidelink Downlink Channel
PSCCH Physical Sidelink Control Channel
PSSCH Physical Sidelink Shared Channel
PSCell Primary SCell
PSS Primary Synchronization Signal
PSTN Public Switched Telephone Network
PT-RS Phase-tracking reference signal
PTT Push-to-Talk
PUCCH Physical Uplink Control Channel
PUSCH Physical Uplink Shared Channel
QAM Quadrature Amplitude Modulation
QCI QoS class of identifier
QCL Quasi co-location
QFI QOS Flow ID,
QoS Flow Identifier
QoS Quality of Service
QPSK Quadrature (Quaternary) Phase Shift Keying
QZSS Quasi-Zenith Satellite System
RA-RNTI Random Access RNTI
RAB Radio Access Bearer, Random Access Burst -continued RACH Random Access Channel
RADIUS Remote Authentication Dial In User Service
RAN Radio Access Network
RAND RANDom number (used for authentication)
RAR Random Access Response
RAT Radio Access Technology
RAU Routing Area Update
RB Resource block, Radio Bearer
RBG Resource block group
REG Resource Element Group
Rel Release
REQ REQuest
RF Radio Frequency
RI Rank Indicator
RIV Resource indicator value
RL Radio Link
RLC Radio Link Control, Radio Link Control layer
RLC AM RLC Acknowledged Mode
RLC UM RLC Unacknowledged Mode
RLF Radio Link Failure
RLM Radio Link Monitoring
RLM-RS Reference Signal for RLM
RM Registration Management
RMC Reference Measurement Channel
RMSI Remaining MSI, Remaining Minimum System Information
RN Relay Node
RNC Radio Network Controller
RNL Radio Network Layer
RNTI Radio Network Temporary Identifier
ROHC RObust Header Compression
RRC Radio Resource Control, Radio Resource Control layer
RRM Radio Resource Management
RS Reference Signal
RSRP Reference Signal Received Power
RSRQ Reference Signal Received Quality
RSSI Received Signal Strength Indicator
RSU Road Side Unit
RSTD Reference Signal Time difference
RTP Real Time Protocol
RTS Ready-To-Send
RTT Round Trip Time
Rx Reception, Receiving, Receiver
S1AP S1 Application Protocol
S1-MME S1 for the control plane
S1-U S1 for the user plane
S-CSCF serving CSCF
S-GW Serving Gateway
S-RNTI SRNC Radio Network Temporary Identity
S-TMSI SAE Temporary Mobile Station Identifier
SA Standalone operation mode
SAE System Architecture Evolution
SAP Service Access Point
SAPD Service Access Point Descriptor
SAPI Service Access Point Identifier
SCC Secondary Component Carrier, Secondary CC
SCell Secondary Cell
SCEF Service Capability Exposure Function
SC-FDMA Single Carrier Frequency Division Multiple Access
SCG Secondary Cell Group
SCM Security Context Management
SCS Subcarrier Spacing
SCTP Stream Control Transmission Protocol
SDAP Service Data Adaptation Protocol, Service Data Adaptation Protocol layer
SDL Supplementary Downlink
SDNF Structured Data Storage Network Function
SDP Session Description Protocol
SDSF Structured Data Storage Function
SDT Small Data Transmission
SDU Service Data Unit
SEAF Security Anchor Function
SeNB secondary eNB
SEPP Security Edge Protection Proxy
SFI Slot format indication
SFTD Space-Frequency Time Diversity, SFN and frame timing difference
SFN System Frame Number
SgNB Secondary gNB
SGSN Serving GPRS Support Node -continued S-GW Serving Gateway
SI System Information
SI-RNTI System Information RNTI
SIB System Information Block
SIM Subscriber Identity Module
SIP Session Initiated Protocol
SiP System in Package
SL Sidelink
SLA Service Level Agreement
SM Session Management
SMF Session Management Function
SMS Short Message Service
SMSF SMS Function
SMTC SSB-based Measurement Timing Configuration
SN Secondary Node, Sequence Number
SoC System on Chip
SON Self-Organizing Network
SpCell Special Cell
SP-CSI-RNTISemi-Persistent CSI RNTI
SPS Semi-Persistent Scheduling
SQN Sequence number
SR Scheduling Request
SRB Signalling Radio Bearer
SRS Sounding Reference Signal
SS Synchronization Signal
SSB Synchronization Signal Block
SSID Service Set Identifier
SS/PBCH Block
SSBRI SS/PBCH Block Resource Indicator, Synchronization Signal Block Resource Indicator
SSC Session and Service Continuity
SS-RSRP Synchronization Signal based Reference Signal Received Power
SS-RSRQ Synchronization Signal based ReferenceSignal Received Quality
SS-SINR Synchronization Signal based Signal to Noise and Interference Ratio
SSS Secondary Synchronization Signal
SSSG Search Space Set Group
SSSIF Search Space Set Indicator
SST Slice/Service Types
SU-MIMO Single User MIMO
SUL Supplementary Uplink
TA Timing Advance, Tracking Area
TAC Tracking Area Code
TAG Timing Advance Group
TAI Tracking Area Identity
TAU Tracking Area Update
TB Transport Block
TBS Transport Block Size
TBD To Be Defined
TCI Transmission Configuration Indicator
TCP Transmission Communication Protocol
TDD Time Division Duplex
TDM Time Division Multiplexing
TDMATime Division Multiple Access
TE Terminal Equipment
TEID Tunnel End Point Identifier
TFT Traffic Flow Template
TMSI Temporary Mobile Subscriber Identity
TNL Transport Network Layer
TPC Transmit Power Control
TPMI Transmitted Precoding Matrix Indicator
TR Technical Report
TRP, TRxP Transmission Reception Point
TRS Tracking Reference Signal
TRx Transceiver
TS Technical Specifications, Technical Standard
TTI Transmission Time Interval
Tx Transmission, Transmitting, Transmitter
U-RNTI UTRAN Radio Network Temporary Identity
UART Universal Asynchronous Receiver and Transmitter
UCI Uplink Control Information
UE User Equipment
UDM Unified Data Management
UDP User Datagram Protocol
UDSF Unstructured Data Storage Network Function
UICC Universal Integrated Circuit Card
UL Uplink -continued UM Unacknowledged Mode
UML Unified Modelling Language
UMTS Universal Mobile Telecommunications System
UP User Plane
UPF User Plane Function
URI Uniform Resource Identifier
URL Uniform Resource Locator
URLLC Ultra-Reliable and Low Latency
USB Universal Serial Bus
USIM Universal Subscriber Identity Module
USS UE-specific search space
UTRA UMTS Terrestrial Radio Access
UTRAN Universal Terrestrial Radio Access Network
UwPTS Uplink Pilot Time Slot
V2I Vehicle-to-Infrastruction
V2P Vehicle-to-Pedestrian
V2V Vehicle-to-Vehicle
V2X Vehicle-to-everything
VIM Virtualized Infrastructure Manager
VL Virtual Link, VLAN Virtual LAN, Virtual Local Area Network
VM Virtual Machine
VNF Virtualized Network Function
VNFFG VNF Forwarding Graph
VNFFGD VNF Forwarding Graph Descriptor
VNFM VNF Manager
VoIP Voice-over-IP, Voice-over-Internet Protocol
VPLMN Visited Public Land Mobile Network
VPN Virtual Private Network
VRB Virtual Resource Block
WiMAX World-wide Interoperability for Microwave Access
WLANWireless Local Area Network
WMAN Wireless Metropolitan Area Network
WPANWireless Personal Area Network
X2-C X2-Control plane
X2-U X2-User plane
XML eXtensible Markup Language
XRES EXpected user RESponse
XOR eXclusive OR
ZC Zadoff-Chu
ZP Zero power

Terminology

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

The invention claimed is:

1. One or more non-transitory computer-readable media (NTCRM) comprising instructions that, upon execution of the instructions by one or more processors, are to cause a user equipment (UE) to:

identify, from a base station, a first transmission on a first downlink channel that includes a downlink control information (DCI) format 4_2 with an indication of a scheduling parameter for a multicast transmission on a second downlink channel;

identify that a beam parameter related to transmission of the multicast transmission is not present in the DCI format 4_2;

identify, based on a comparison of a timing threshold to a time difference between an end of the first transmission and a beginning of the multicast transmission, a beam parameter of the first transmission that corresponds to the beam parameter of the multicast transmission; and identify the multicast transmission based on the beam parameter of the first transmission.

2. The one or more NTCRM of claim 1, wherein the first downlink channel is a physical downlink control channel (PDCCH).

3. The one or more NTCRM of claim 1, wherein the second downlink channel is a physical downlink shared channel (PDSCH).

4. The one or more NTCRM of claim 1, wherein the DCI format 4_2 is a DCI format that is related to scheduling a multicast PDSCH transmission.

5. The one or more NTCRM of claim 1, wherein identification of the beam parameter of the first transmission is further based on an active bandwidthpart (BWP) in which the multicast transmission is scheduled for transmission.

6. The one or more NTCRM of claim 5, wherein the identification of the beam parameter of the first transmission is further based on a common frequency resource (CFR) of the BWP.

7. The one or more NTCRM of claim 1, wherein the beam parameter of the first transmission is related to a transmission configuration indicator (TCI) state.

8. An apparatus for use in a user equipment (UE), wherein the apparatus comprises:

memory to store a received first transmission on a first downlink channel that includes a downlink control information (DCI) format 4_2 with an indication of a scheduling parameter for a multicast transmission on a second downlink channel; and one or more processors configured to:

identify that a beam parameter related to transmission of the multicast transmission is not present in the DCI format 4_2;

identify, based on a comparison of a timing threshold to a time difference between an end of the first transmission and a beginning of the multicast transmission, a beam parameter of the first transmission that corresponds to the beam parameter of the multicast transmission; and identify the multicast transmission based on the beam parameter of the first transmission.

9. The apparatus of claim 8, wherein the first downlink channel is a physical downlink control channel (PDCCH).

10. The apparatus of claim 8, wherein the second downlink channel is a physical downlink shared channel (PDSCH).

11. The apparatus of claim 8, wherein the DCI format 4_2 is a DCI format that is related to scheduling a multicast PDSCH transmission.

12. The apparatus of claim 8, wherein identification of the beam parameter of the first transmission is further based on an active bandwidthpart (BWP) in which the multicast transmission is scheduled for transmission.

13. The apparatus of claim 12, wherein the identification of the beam parameter of the first transmission is further based on a common frequency resource (CFR) of the BWP.

14. The apparatus of claim 8, wherein the first transmission is a unicast transmission.

15. One or more non-transitory computer-readable media (NTCRM) comprising instructions that, upon execution of the instructions by one or more processors, are to cause a base station to:

transmit, to a user equipment (UE), a first transmission on a first downlink channel that includes a downlink control information (DCI) format 4_2 with an indication of a scheduling parameter for a multicast transmission on a second downlink channel;

identify that a beam parameter related to transmission of the multicast transmission is not present in the DCI format 4_2;

identify, based on a comparison of a timing threshold to a time difference between an end of the first transmission and a beginning of the multicast transmission, a beam parameter of the first transmission that corresponds to the beam parameter of the multicast transmission; and transmit, to the UE, the multicast transmission based on the beam parameter of the first transmission.

16. The one or more NTCRM of claim 15, wherein the first downlink channel is a physical downlink control channel (PDCCH).

17. The one or more NTCRM of claim 15, wherein the second downlink channel is a physical downlink shared channel (PDSCH).

18. The one or more NTCRM of claim 15, wherein the DCI format 4_2 is a DCI format that is related to scheduling a multicast PDSCH transmission.

19. The one or more NTCRM of claim 15, wherein identification of the beam parameter of the first transmission is further based on an active bandwidthpart (BWP) in which the multicast transmission is scheduled for transmission.

20. The one or more NTCRM of claim 15, wherein the first transmission is a unicast transmission.

* * * * *